US011107498B2

(12) United States Patent
Dickenhorst

(10) Patent No.: US 11,107,498 B2
(45) Date of Patent: Aug. 31, 2021

(54) APPARATUS FOR PRODUCING N-LAYER OPTICAL INFORMATION CARRIERS AND METHOD THEREFOR

(71) Applicant: Sonopress GmbH, Gütersloh (DE)

(72) Inventor: Jörg Dickenhorst, Werther (DE)

(73) Assignee: Sonopress GmbH, Gütersloh (DE)

( * ) Notice: Subject to any disclaimer, the term of this patent is extended or adjusted under 35 U.S.C. 154(b) by 9 days.

(21) Appl. No.: 16/464,903

(22) PCT Filed: Jun. 29, 2017

(86) PCT No.: PCT/EP2017/066122
§ 371 (c)(1),
(2) Date: May 29, 2019

(87) PCT Pub. No.: WO2019/001711
PCT Pub. Date: Jan. 3, 2019

(65) Prior Publication Data
US 2019/0287564 A1  Sep. 19, 2019

(51) Int. Cl.
*G11B 7/26* (2006.01)
*G05B 19/18* (2006.01)
*G11B 7/24038* (2013.01)

(52) U.S. Cl.
CPC ............ *G11B 7/263* (2013.01); *G05B 19/182* (2013.01); *G11B 7/24038* (2013.01); *G11B 7/265* (2013.01); *G05B 2219/45244* (2013.01)

(58) Field of Classification Search
CPC ..... G11B 7/263; G11B 7/265; G11B 7/24038; G05B 19/182; G05B 2219/45244
See application file for complete search history.

(56) References Cited

U.S. PATENT DOCUMENTS

2005/0046891 A1* 3/2005 Pavlov ................. G06F 3/1204
358/1.15
2007/0291630 A1  12/2007 Nishimura
(Continued)

FOREIGN PATENT DOCUMENTS

WO        2011091561 A1    8/2011

OTHER PUBLICATIONS

WIPO, International Search Report (on priority application), dated Mar. 23, 2018.

*Primary Examiner* — Mohammad Ali
*Assistant Examiner* — Sheela Rao
(74) *Attorney, Agent, or Firm* — Laurence P. Colton; Smith Tempel Blaha LLC

(57) ABSTRACT

A device for manufacturing an n-layered optical information carrier having an injection molding unit for manufacturing a carrier body with a first information layer, and furthermore, a first embossing unit for manufacturing a second information layer. The second information layer has an input via which information carriers can be received in the embossing unit. The embossing unit moreover has an output unit via which the coated information carriers are output. (n−2) additional embossing units are associated with the device, for manufacturing in each case an additional information layer, wherein "n" is greater than two. The respective units are linked to one another so that the n-layered information carrier is manufactured in an inline manufacturing. The (n−2) additional embossing units can be coupled to and uncoupled from the device, wherein the additional embossing units in each case have an input and an output unit.

9 Claims, 2 Drawing Sheets

(56) References Cited

U.S. PATENT DOCUMENTS

2010/0028590 A1    2/2010   Ohoshi
2011/0019527 A1*   1/2011   Mueller ............. G11B 23/0021
                                                             369/283
2012/0006399 A1*   1/2012   Van Erven .......... H01L 31/0236
                                                             136/256
2018/0096966 A1*   4/2018   Meyer ..................... H01L 24/96

* cited by examiner

APPARATUS FOR PRODUCING N-LAYER OPTICAL INFORMATION CARRIERS AND METHOD THEREFOR

CROSS REFERENCE TO RELATED APPLICATIONS

This patent application is the US National Phase of International Application No. PCT/EP2017/066122 having an International Filing Date of 29 Jun. 2017.

BACKGROUND OF THE INVENTION

Technical Field

The invention relates to an apparatus and a device for manufacturing and producing an n-layered optical information carrier, which comprises an injection molding unit for manufacturing a carrier body with a first information layer, a first embossing unit for manufacturing a second information layer, which comprises an input via which information carriers can be received in the embossing unit, wherein the embossing unit moreover comprises an output unit via which the coated information carriers are output, and to a method for manufacturing such an information carrier.

Prior Art

The optical information carriers of the first two generations, laser discs and CDs, are manufactured during the injection molding process in that, during the injection molding process, the information is introduced on one side into the carrier body. This information layer is provided with a reflective coating and read out through the carrier body. The two-layered laser disc was manufactured so that two supporting bodies of half the total thickness were manufactured and stuck together on the information carrying sides provided with a reflective coating. Specified in the next generation of optical information carriers, DVDs, are designs which can no longer be manufactured by injection molding alone, since at least one side of a half-thickness carrier body has to be provided with two information layers. For manufacturing the second information layer, an embossing process inter alia is developed. On the first information layer provided with a semi-reflective coating, which is manufactured as described above, a lacquer having a thickness of several µm is applied. Into this lacquer, which is thoroughly pre-cured, a tool whose surface carries a negative of the information layer is pressed, and the lacquer is cured, as a rule by UV radiation. Subsequently, the second information layer is accordingly provided with a reflective coating and the half-thickness carrier bodies are stuck together on the information-carrying sides.

In the BLU-RAY DISC® optical discs, abbreviated BD, the information-carrying layer is located on the outside, i.e., the information is no longer read out through the carrier body. The BD is defined in two versions, a BD-25 which contains an information layer which can be generated by injection molding, and a BD-50, a two-layered information carrier in which the second layer is manufactured as a rule by embossing. A device for manufacturing a BD in many cases consists of an injection molding unit in which the carrier body is manufactured with the embossed first information layer, and of an embossing unit. In said embossing unit, as a rule, first the first information layer is provided with a reflective coating, and subsequently a lacquer is applied onto the reflective coating, the information is embossed, wherein the lacquer is cured by UV radiation, and a protective layer is applied. Precisely since the requirements of the manufacturing accuracy of an embossing unit are very high, this is also reflected in the price of such an installation.

Most recently, the ultrahigh density BLU-RAY DISC® optical disc, abbreviated UHD-BD, has been discussed. The UHD-BD technique is based on the BD technique, wherein the information density of the individual information layers has been increased. Moreover, the specification defines both a two-layered implementation, UHD-BD 66, as well as a three-layered implementation, UHD-BD 100.

In view of the high price of the embossing unit, two manufacturing methods for UHD-BD 100 have become established. In one installation which consists of an injection molding unit and an embossing unit, a two-layered UHD-BD is manufactured and temporarily stored. After the completion of these manufacturing steps, the temporarily stored discs are again supplied to the embossing unit, and receive the application of the third information layer like the second applied information layer and are provided with a protective layer. A disadvantage of this method, also referred to as batch method, is that a certain degree of overmanufacturing must occur, since a proportion of rejects has to be included in the calculations in the manufacturing of the third information layer. A post-manufacturing is difficult, since the embossing unit would first have to be converted back again, so that a certain level of overmanufacturing is more cost effective. Another disadvantage is that during temporary storage the fabricated discs cool off, which changes the physical and chemical parameters so that the number of rejects increases during the manufacturing of the third layer.

Singulus Technologies AG offers a manufacturing concept in which a station is built in between the injection molding unit and the embossing unit, by means of which a second information layer can be embossed. In the manufacturing of a two-layered UHD-BD, this station is simply bypassed and no longer participates in the manufacturing process. A disadvantage of this installation is that even in the manufacturing of a two-layered information carrier, the station cannot be used in other processes.

BRIEF SUMMARY OF THE INVENTION

The aim of the invention is to provide a device in which the information carriers to be manufactured are manufactured with any desired number of information layers in a continuous process, so-called inline manufacturing. Here, the device should be used as effectively as possible.

The aim is achieved by a device for manufacturing an n-layered optical information carrier, comprising an injection molding unit for manufacturing a carrier body with a first information layer, a first embossing unit for manufacturing a second information layer, which comprises an input via which information carriers can be received in the embossing unit, wherein the embossing unit moreover comprises an output unit via which the coated information carriers are output, characterized in that (n−2) additional embossing units are associated with device, for manufacturing in each case an additional information layer, wherein "n" is greater than two, and the respective units are linked to one another so that the n-layered information carrier is manufactured in an inline manufacturing, and that the (n−2) additional embossing units can be coupled to and uncoupled from the device, wherein the additional embossing units in each case comprise an input and an output unit. Preferred embodiments are described in the dependent claims.

An exemplary device according to the invention for manufacturing an n-layered optical information carrier comprises the following: an injection molding unit for manufacturing a carrier body with a first information layer, a first embossing unit for manufacturing a second information layer, which has an input via which information carriers can be received in the embossing unit. This embossing unit and any additional embossing unit moreover has, in addition to an input, an output unit via which the coated information carriers are output. Here, (n−2) additional embossing units for manufacturing in each case an additional information layer, wherein "n" is greater than two, are associated with the device, and the respective units are linked to one another in such a manner that the n-layered information carrier is manufactured in an inline manufacturing. The (n−2) additional embossing units are here designed and arranged so that they can be coupled to and uncoupled from the device, wherein—as mentioned—the additional embossing units in each case comprise an input and an output unit.

With an injection molding unit and the first embossing unit, a two-layered optical information carrier can be manufactured. Here an embossing unit preferably comprises at least one application device for the lacquer forming the information layer, an embossing device by means of which the information can be transferred into the lacquer, and a curing device which can certainly also be a component of the embossing device, a metallization device, an application and curing device for the cover lacquer, and an output unit. For additional intermediate steps, additional devices, such as a quality inspection device, for example, can certainly also be built in. Likewise, some devices can be present in duplicate.

If an additional embossing unit is then set up behind the first embossing unit and connected to the two-layer manufacturing device, then the device for the cover coating in the first embossing unit is switched off. The cover coating then occurs, for example, always in the respective last embossing unit of the process chain. By means of this device, a three-layered optical information carrier can be manufactured. With an additional embossing unit, a four-layered information carrier can be manufactured. The system is set up in such a way that by the setup of (n−1) embossing units, an n-layered optical information carrier can be manufactured in an inline manufacturing. An advantage of inline manufacturing is that, by the curing of the layer in which the new information layer has been embossed, and the subsequent required metallization, the disc is brought to a temperature which is nearly ideal for the adhesion of the next layer. No prolonged temporary storage occurs as in the batch manufacturing, in which the discs cool off, preferred temperature gradients are degraded, and/or the chemical constitution of the surface changes.

In a preferred embodiment, a control unit which controls the manufacturing process is associated with the device. By the incorporation of machines of different manufacturers in a control unit, the coordination of the program sequence is simplified.

In a particularly preferred embodiment, the control unit is programmed so that the change of the manufacturing process for manufacturing different multi-layered optical information carriers requires only a few setting steps. The operator of such a device can then input the changes via an operating unit, in particular via an operating display. In a most particularly preferred embodiment, the operator can simply input the number of the layers of the information carrier to be fabricated on an operating display, and the control system adjusts the functions of individual embossing units. This can lead to the point that, in a control step for this manufacturing process, (an) unneeded embossing unit(s) can be uncoupled.

In another preferred embodiment, the coupling between the different embossing units occurs in that the output unit is connected to the input of the next embossing unit in the arrangement. Known commercial embossing units as a rule have five output stations in an output unit, in which the fabricated information carriers are deposited and collected. However, embodiments that have more or fewer output stations also exist. The collected information carriers are then removed from the output stations and supplied to the additional processing. If an output station of an output unit is then converted so that the information carrier deposited there can be transported to the next embossing unit, the two embossing units are coupled. The transport can occur via a conveyor belt; however, a beam conveyor is also conceivable, or simply a storage place from which a transfer robot transfers the information carrier to the next embossing unit. Any other automatic transfer is also conceivable, by means of which the manufacturing line between the embossing units can be closed. The selected output station which is converted for the coupling can be selected as desired and adapted to the arrangement of the embossing units with respect to one another.

By far the most complex and expensive element of the invention is the embossing unit. If not all the embossing units are necessary for the manufacturing of the requested optical information carriers, then the unneeded embossing units to the rear in the installation can be uncoupled. In order not to leave the at least one uncoupled embossing unit unused, said unit can be coupled to another injection molding unit.

In another preferred embodiment, the at least one uncoupled embossing unit can be coupled to an additional injection molding unit, so that an additional independent device for manufacturing a multi-layered information carrier is formed thereby. The embossing units thus can be used much more intensively, which lowers the unit cost of the information carriers.

A most particularly preferred embodiment comprises a space for positioning the additional injection molding unit, in which the additional injection molding unit is arranged and connected to the at least one uncoupled embossing unit. Preferably, the arrangement of the injection molding unit occurs so that the at least one uncoupled embossing unit is not moved for the coupling to the additional injection unit. The advantage of this procedure is that the parameters of the embossing unit do not have to be re-set, since the unit has not been moved. The setup time of the additional device and the associated manufacturing downtime are kept as short as possible.

The defined aim is achieved also by a method for manufacturing an n-layered optical information carrier, comprising manufacturing of a carrier body with a first information layer in an injection molding process, wherein the first information layer is provided with a reflective layer, application of a second information layer by means of an embossing process, wherein the second information layer is provided with a corresponding reflective layer, and application of (n−2) additional information layers by means of the embossing process and providing each of the information layers with a corresponding reflective layer, wherein "n" is greater than two, characterized in that the n-layered information carrier is manufactured in an inline manufacturing, wherein each information layer, except for the first one, is manufactured on its own embossing unit, and the process is terminated after the last applied information layer by the application of a cover layer. A preferred method for manufacturing an n-layered optical information carrier comprises the following steps:

Manufacturing of a carrier body with a first information layer in an injection molding process, wherein the first information layer is provided with a reflective layer, Application of a second information layer by means of an embossing process, wherein the second information layer is provided with a corresponding reflective layer, and Application of (n−2) additional information layers by means of the embossing process and providing each of the information layers with the corresponding reflective layer, wherein "n" is greater than two. In the process, the n-layered information carrier is manufactured in an inline manufacturing, wherein each information layer, except for the first one, is manufactured on its own embossing unit, and the process is terminated after the last applied information layer by the application of a cover layer.

Due to the fact that each information layer is manufactured in its own embossing unit, it is possible to quickly change the number of layers of the optical information carrier to be manufactured. The embossing unit of the last layer to be applied does not transfer the information carrier to the next embossing unit, but instead applies the closure layer and places the information carrier on an unconverted output station of the output unit.

In a preferred embodiment of the method, the manufacturing process is terminated after the application of two or more layers. In a particularly preferred embodiment, the unused embossing units are removed from the control system. Thereby, the unused embossing units can be decommissioned or be supplied to another application.

In a most particularly preferred embodiment of the invention, the embossing units which have been removed from the control system are supplied to an additional separate process and incorporated in terms of the control system in this additional process. The embossing units which have been removed from the control system are thus not decommissioned, but rather are supplied to another process which reduces the downtimes of these embossing units and allows a more effective use of the embossing units.

In another most particularly preferred method, the embossing units are not spatially moved. A movement of the embossing unit would mean switching off the embossing unit, during which a number of complex sensitive process steps would have to be switched off. The recommissioning after a conversion would entail a re-determination of the process parameters, which is very time consuming. If the embossing unit remains on site and the injection molding unit is coupled to it, the operation of the additional device can be started rapidly.

BRIEF DESCRIPTION OF THE DRAWINGS

The invention is explained below in several embodiment examples.

DETAILED DESCRIPTION OF PREFERRED EMBODIMENTS

Figure 1:
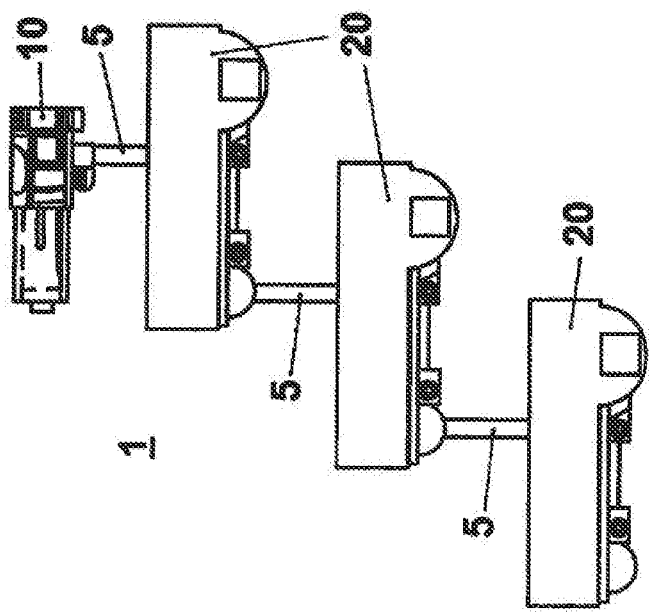
FIG. 1 shows the diagrammatic setup of a device according to the invention with n=4.

FIG. 1 shows a device 1 for manufacturing a four-layered optical data carrier. During the injection molding in the injection molding unit 10, the first information layer is introduced into the carrier body. The injection molding unit 10 is connected via a transport device 5 to the first embossing unit 20. There, the second information layer is applied, and the carrier body is transferred via an additional transport device to the second embossing unit 20. There, in turn, the third information layer is applied, the information carrier is transferred by means of an additional transport device 5 to the fourth embossing unit 20, where it is provided with the fourth information layer and completed with a cover layer. By the arrangement of any desired number of embossing machines one after another in a row, an optical data carrier having any desired number of information layers can thus be manufactured in one manufacturing line.

Figure 2:
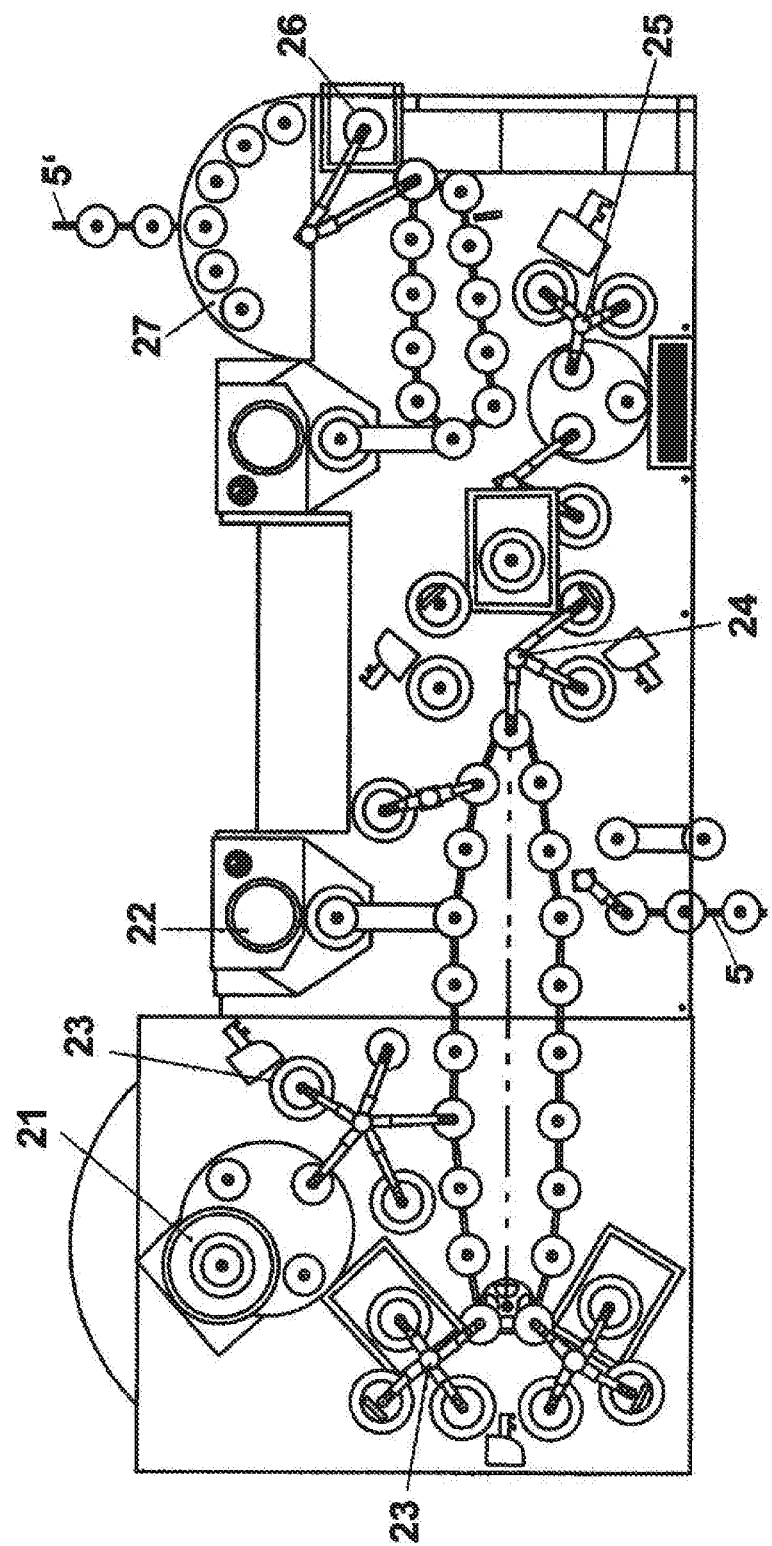
FIG. 2 shows the layout of an embossing unit.

In FIG. 2, an embossing unit 20 is explained in further detail based on an embodiment example. Via the transport device 5, the information carrier reaches the embossing unit 20. When the information carrier leaves the injection molding unit 10, then it is provided with a reflective coating in the metallization device 22. Subsequently, the embossing lacquer is coated in a coating device for the embossing 23. It has been found to be advantageous to carry out this coating in two steps. The first approximately 80% of the layer thickness is applied and cured; subsequently the rest of the lacquer is applied, so that, during the embossing process in the embossing device 21 where the lacquer is cured with the embossing matrix applied, less radiation, in particular less UV radiation, has to be introduced for the curing, so that the associated material stress of the carrier body is considerably reduced thereby. After the subsequent metallization in the device 22, the information carrier is checked for optical defects in the quality inspection device 26, and, if the result of the check is positive, it is deposited in the output unit 27 onto the transport device 5' which transfers the information carrier to the next embossing unit 20. When the process for manufacturing the layers is running in a stable manner, the quality inspection device 26 can also be removed from the process, and the quality control can occur only after the application of the last layer.

In the last embossing unit 20 in the device arrangement, the information carrier is supplied to the coating device for cover lacquer 24 after the metallization 22, in order to be supplied subsequently to the coating device for the surface protective layer 25. There, the surface is coated with a thin scratch-resistant layer. After passing the quality inspection device 26, in which the optical information carrier is checked in particular for optical defects, the information carrier in the output unit 27 is stored on an output station on which no transport device 5' is arranged.

Figure 3:
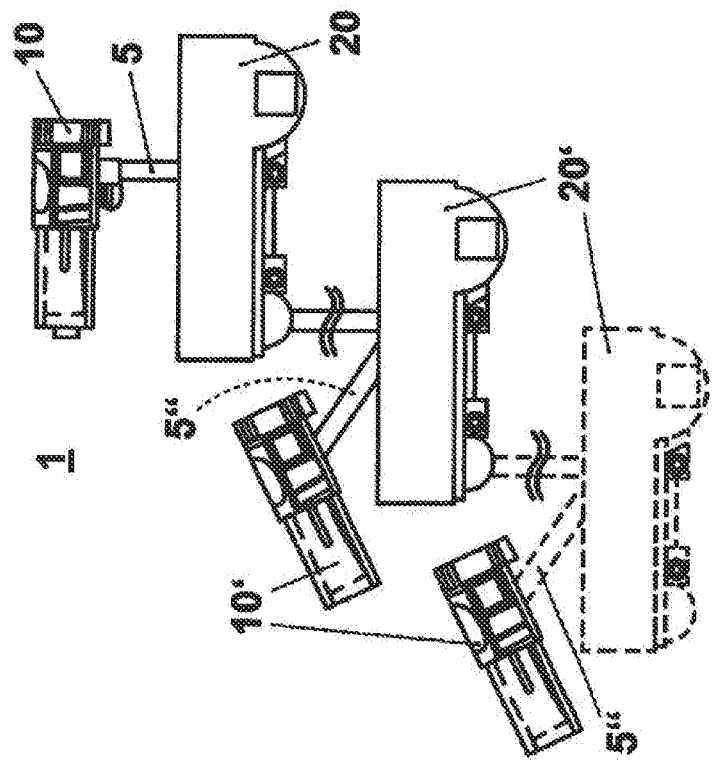
FIG. 3 shows the incorporation of an embossing unit in an additional device.

In the example shown in FIG. 3, the device 1 from FIG. 1 is converted for the manufacturing of a two-layered optical information carrier. Here, the last two embossing units 20' have been uncoupled. In each case, an additional injection unit 10' has been associated with these embossing units 20' and connected to a transport device 5''. Thus, starting from the previous device for manufacturing a four-layered optical data carrier, three devices for manufacturing a two-layered information carrier 1, 1' can be manufactured. In this way, the individual embossing units 20, 20' can be used in a versatile manner, which leads to a higher workload and thus to a more advantageous manufacturing in terms of unit cost.

What is claimed is:
1. A device (1) for manufacturing an n-layered optical information carrier, comprising:
   an injection molding unit (10, 10') for manufacturing a carrier body with a first information layer;

a first embossing unit (20) operatively connected to the injection molding unit for manufacturing a second information layer, wherein the embossing unit comprises at least one applicator device (23) for lacquer forming the information layer, an embossing device (21) with which the information is transferred into the lacquer, a curing device for curing the lacquer, a metallizing device (22), an application and curing device for applying and curing covering lacquer, and an input via which information carriers are receivable in the embossing unit (20), wherein the embossing unit further comprises an output unit (27) via which the coated information carriers are discharged; and (n−2) additional embossing units (20, 20') operatively connected to the first embossing unit (20) for manufacturing an additional information layer, wherein "n" is greater than two, and the respective units (10, 20; 10', 20') are linked to one another so that the n-layered information carrier is manufactured in an inline manufacturing, and that the (n−2) additional embossing units (20) are coupled to and uncoupled from the device, wherein the additional embossing units (20, 20') in each case comprise an input and an output unit (27), wherein at least one uncoupled embossing unit (20') are couplable to a further injection molding unit (10') so that a further independent apparatus (1') is thus formed for producing a multi-layered information carrier.

2. The device (1) according to claim 1, further comprising a control device which controls the manufacturing process.

3. The device (1) according to claim 2, wherein the control unit is programmed to allow an adjustment of the manufacturing process for manufacturing different multi-layered optical information carriers.

4. The device (1) according to claim 1, wherein a coupling (5, 5') between the different additional embossing units (20) occurs in that the output unit (27) of one of the additional embossing units (20) is connected to the input of the next of the additional embossing units (20) in the arrangement.

5. The device (1) according to claim 1, further comprising a space for positioning the further injection molding unit (10'), in which space the further injection molding unit (10') is arranged and connected to the at least one uncoupled embossing unit (20').

6. A method for manufacturing an n-layered optical information carrier, comprising the following steps:

manufacturing a carrier body with a first information layer in an injection molding process, wherein the first information layer is provided with a reflective layer;

applying a second information layer to the carrier body by means of an embossing process, wherein the second information layer is provided with a corresponding reflective layer; and applying (n−2) additional information layers to the carrier body by means of the embossing process and providing each of the additional information layers with a corresponding reflective layer, wherein "n" is greater than two, wherein the n-layered information carrier is manufactured in an inline manufacturing process, wherein each information layer, except for the first information layer, is manufactured on its own embossing unit (20), wherein the embossing unit (20) comprises at least one application device (23) for lacquer forming the information layer, an embossing device (21) with which information is transferred into the lacquer, a curing device for curing the lacquer, a metallizing device (22), an application and curing device for applying and curing covering lacquer, and an output unit (27), and the manufacturing process is terminated after the last applied information layer by the application of a cover layer, a control unit controls the manufacturing process, during the production of a multi-layer optical information carrier having less than n layers not all the embossing units are used, wherein the unused embossing units (20') are removed from the manufacturing process, and the unused embossing units (20') removed from the manufacturing process are supplied to an additional process and are incorporated with technical control into the additional process.

7. The method according to claim 6, wherein the manufacturing process is terminated after the application of two or more layers.

8. The method according to claim 6, wherein the unused embossing units (20') are not spatially moved during the removal from the manufacturing process and the incorporation into the additional process.

9. A device (1) for manufacturing an n-layered optical information carrier, comprising:

an injection molding unit (10, 10') for manufacturing a carrier body with a first information layer;

a first embossing unit (20) operatively connected to the injection molding unit for manufacturing a second information layer, wherein the embossing unit comprises at least one applicator device (23) for lacquer forming the information layer, an embossing device (21) with which the information is transferred into the lacquer, a curing device for curing the lacquer, a metallizing device (22), an application and curing device for applying and curing covering lacquer, and an input via which information carriers are received in the embossing unit (20), wherein the embossing unit further comprises an output unit (27) via which the coated information carriers are discharged; and (n−2) additional embossing units (20, 20') operatively connected to the first embossing unit (20) for manufacturing an additional information layer, wherein "n" is greater than two, and the respective units (10, 20; 10', 20') are linked to one another so that the n-layered information carrier is manufactured in an inline manufacturing, and that the (n−2) additional embossing units (20) are coupled to and uncoupled from the device, wherein the additional embossing units (20, 20') in each case comprise an input and an output unit (27), wherein at least one uncoupled embossing unit (20') is couplable to a further injection molding unit (10') so that a further independent apparatus (1') is thus formed for producing a multi-layered information carrier without spatially moving of the one uncoupled embossing unit (20') during the removal from the manufacturing process and the incorporation into the additional process.

* * * * *